Sept. 27, 1966  P. MEIJERS  3,275,291
DIAPHRAGM CHECK VALVE
Filed June 30, 1964
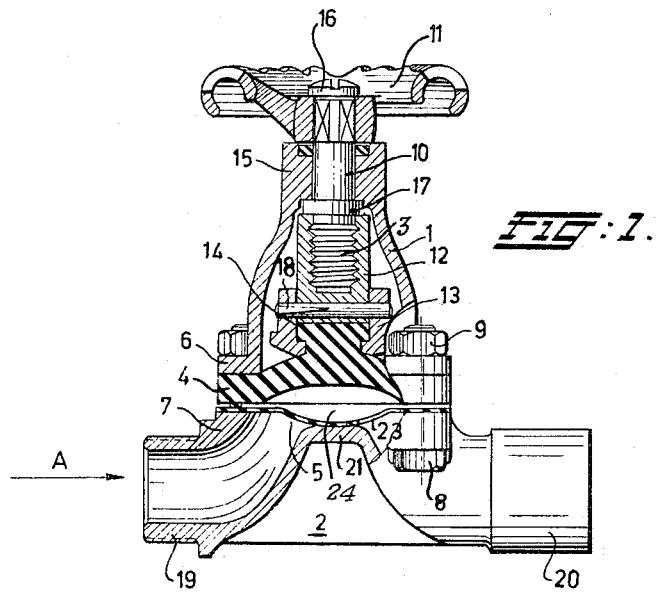
FIG:1.
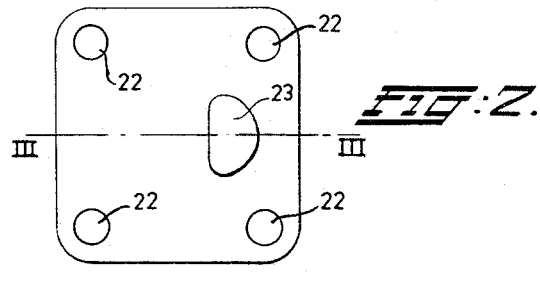
FIG:2.
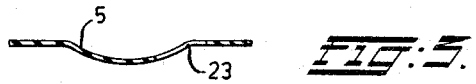
FIG:3.
INVENTOR.
PIETER MEIJERS
BY

United States Patent Office 3,275,291
Patented Sept. 27, 1966

3,275,291
DIAPHRAGM CHECK VALVE
Pieter Meijers, The Hague, Netherlands, assignor to Gemeente 's-Gravenhage, The Hague, Netherlands
Filed June 30, 1964, Ser. No. 379,295
Claims priority, application Netherlands, July 8, 1963, 295,056
5 Claims. (Cl. 251—331)

This invention relates generally to valves, and more particularly to diaphragm valves used for example, in town water mains.

It has for its general object to provide a diaphragm valve of rather simple build constituting in itself also a nonreturn flap preventing back-flow of the fluid through the valve in the event that fluid pressure in the outlet passage exceeds the fluid pressure in the inlet passage when the diaphragm is moved away from its seat.

An important feature of the invention is the provision of a first body portion having an opening in a surface thereof and an internal protuberance defining a seat extending across said opening and facing in the same direction as said surface, said first body portion further having inlet and outlet passages respectively extending to and from said opening at the opposite sides of said seat, an elastic membrane extending over said opening, a flexible diaphragm superposed on said elastic membrane, a second body portion having a surface mating with said surface of the first body portion, means securing together said first and second body portions with the peripheries of said membrane and diaphragm clamped between the mating surfaces of said body portions, and control means carried by said second body portion and connected with said diaphragm to move the latter toward and away from said seat, said elastic membrane having an aperture therein at the side of said seat from which said outlet passage extends so that, in the event that fluid pressure in said outlet passage exceeds the fluid pressure in the inlet passage when said diaphragm is moved away from said seat, the excess pressure urges fluid to enter between said diaphragm and membrane to urge the latter into sealing engagement with said seat and thereby prevent back-flow through the valve.

In an advantageous and preferred embodiment the elastic membrane is preformed so as to be yieldably urged against the seat when the periphery of the membrane rests on the surface of the first body portion of the valve.

Other objects of the invention will appear as the following description proceeds.

In the drawing which accompanies the specification:

FIGURE 1 shows in front view, partly in section, the diaphragm valve according to the invention;

FIGURE 2 is a plan view of the elastic membrane;

FIGURE 3 is a cross-section taken along the line III—III of FIGURE 2.

The valve comprises an upper body portion 1, a lower body portion 2, a diaphragm 4, an extremely thin and elastic membrane 5 and control means 3 carried by said upper body portion 1 and connected with said diaphragm 4 to move the latter toward and away from the seat of the valve for closing and opening the valve. The upper body portion 1 and the lower body portion 2 have circumferential flanges 6 and 7, respectively, the lower surface of flange 6 mating with the top surface of flange 7 with the peripheries of the diaphragm 4 and the elastic membrane 5 therebetween, and bolts 8 and screws 9 securing together said upper and lower body portions 1 and 2 so as to clamp the peripheries of said diaphragm 4 and membrane 5 between said mating surfaces.

The control means 3 consists of a valve stem 10, a rotatable knob 11, a threaded sleeve 12 and a claw 13 designed to hold the central portion 14 of the diaphragm 4. The non-threaded end portion of the valve stem 10 is bearing rotatably in a narrower neck 15 of the upper body portion 1. The rotatable knob 11 is arranged onto the portion of the valve stem 10 protruding from the upper body portion 1 so that this knob 11 is slidable but not rotatable with respect to the stem 10. After mounting the rotatable knob 11 onto the valve stem 10 this knob 11 is secured on said stem 10 by means of a locking screw bolt 16. Further the valve stem 10 is provided with a flange 17 of a slightly greater diameter, and when the rotatable knob 11 is secured onto the valve stem 10 this flange 17 is situated within the upper body portion 1 against the bottom face of the narrower neck 15. The portion of the valve stem 10 situated beneath the flange 17 is threaded outside enabling said portion to be screwed into the sleeve 12 correspondingly threaded inside. By means of a key 18 the sleeve 12 is connected to the claw 13.

The lower body portion 2 is provided with an inlet stub 19 and an outlet stub 20. Both stubs 19 and 20 are conventionally threaded inside so to obtain liquid-tight connections with tubes correspondingly threaded outside. The wall of the lower body portion 2 opposing the diaphragm 4 has a protuberance 21 defining the seat of the valve.

The extremely thin and elastic membrane 5 preferably of a plastic is provided with apertures 22 enabling the screw bolts 8 to pass through the membrane 5 and with an aperture 23 (see FIGS. 2 and 3). It is obvious that more than one aperture 23 may be arranged in this membrane 5 provided that all said apertures must be situated at the same side of the membrane i.e. at the side of the seat 21 from which the outlet passage extends.

This diaphragm valve forming in itself also the non-return flap operates as follows. The fluid for instance water is usually supplied according to the arrow A in FIG. 1. The valve is illustrated in the entirely open position the portion of the valve stem 10 screwed entirely into the threaded sleeve 12 moved thereby into its highest position whereas by means of the claw 13 the diaphragm 4 preferably made of rubber is lifted into its highest position also. Under influence of the pressure of the water tending to flow through the passage the extremely thin and elastic membrane is forced to follow the move upwards of the diaphragm 4 so that the water stream freely can flow through the passage. However, as soon as the fluid pressure in the outlet passage exceeds the fluid pressure in the inlet passage the water tending to flow back through the valve opposite to the arrow A the membrane 5 is urged immediately into the position illustrated in FIG. 1 the excess pressure urging the fluid to enter through the aperture 23 into the cavity 24 between the diaphragm 4 and the membrane 5. Now the valve acts as a non-return flap. At the time that the normal water stream is restored filling the cavity 24 is expelled therefrom and the membrane 5 moves again toward the diaphragm 4. Turning the rotatable knob 11 in the direction to screw the threaded portion of the valve stem 10 out of the sleeve 12 thus forcing this sleeve downwards so that the diaphragm 4 and automatically also the diaphragm film 5 are urged in sealing contact with said seat 21 closing definitely the passage through the valve.

What is claimed is:

1. A valve comprising a first body portion having an opening in a surface thereof and an internal protuberance defining a seat extending across said opening and facing in the same direction as said surface, said first body portion further having inlet and outlet passages respectively extending to and from said opening at the opposite sides of said seat, an elastic membrane extending over said opening, a flexible diaphragm superimposed on said elastic membrane, a second body portion having a surface mating with said surface of the first body portion, means securing together said first and second body portions with the peripheries of said membrane and diaphragm clamped between the mating surfaces of said body portions, and control means carried by said second body portion and connected with said diaphragm to move the latter toward and away from said seat, said elastic membrane having an aperture therein at the side of said seat from which said outlet passage extends so that, in the event that fluid pressure in said outlet passage exceeds the fluid pressure in the inlet passage when said diaphragm is moved away from said seat, the excess pressure urges fluid to enter between said diaphragm and membrane to urge the latter into sealing engagement with said seat and thereby prevent back-flow through the valve.

2. A valve as in claim 1; wherein said elastic membrane is preformed so as to be yieldably urged against said seat when the periphery of the membrane rests on said surface of the first body portion.

3. A valve as in claim 1; wherein said control means includes a stem rotatable in said second body portion about an axis perpendicular to the plane of said mating surfaces, and said protuberance and seat are symmetrical with respect to said axis.

4. A valve comprising a lower body portion having a top surface with an opening therein, inlet and outlet passages opening at the opposite ends of said lower body portion and having upwardly curving sections adjacent the middle of the latter to communicate with said opening, an upward protuberance in said lower body portion between the upwardly curving sections of said passages, said protuberance having a top surface extending diametrically across said opening and defining a seat which has said curving sections of the inlet and outlet passages at the opposite sides thereof, an elastic membrane extending over said opening, a flexible diaphragm superposed on said elastic membrane, an upper body portion having a lower surface mating with said top surface with the peripheries of said membrane and diaphragm therebetween, means securing together said upper and lower body portions so as to clamp the peripheries of said diaphragm and membrane between said mating surfaces, and control means carried by said upper body portion and connected with said diaphragm to move the latter toward and away from said seat for closing and opening the valve, said elastic membrane having an aperture therein at the same side of said seat as said curving section of the outlet passage so that, when the valve is open and an excess pressure occurs in said outlet passage, said excess pressure urges fluid to enter through said aperture between said diaphragm and membrane to urge the latter into sealing contact with said seat and thereby prevent back flow through the valve.

5. A valve as in claim 4; wherein said membrane is preformed so as to be yieldably urged downwardly into contact with said seat.

No references cited.

M. CARY NELSON, *Primary Examiner.*

A. ROSENTHAL, *Examiner.*